Patented Jan. 8, 1924.

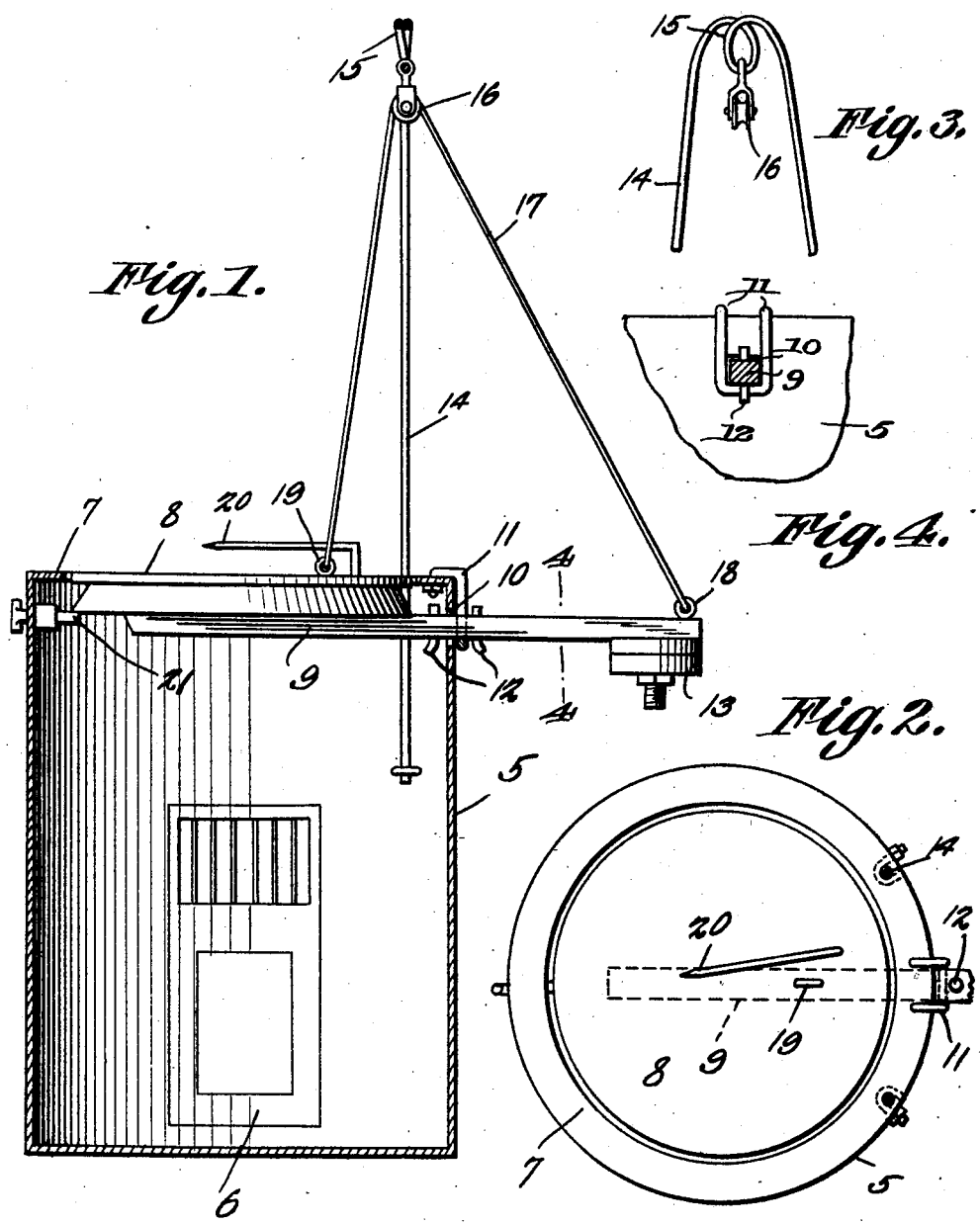

1,480,510

UNITED STATES PATENT OFFICE.

FRANK COLMAN, OF LUMBERTON, MISSISSIPPI.

TRAP.

Application filed December 31, 1921. Serial No. 526,190.

*To all whom it may concern:*

Be it known that I, FRANK COLMAN, a citizen of the United States, residing at Lumberton, in the county of Lamar and State of Mississippi, have invented a new and useful Trap, of which the following is a specification.

This invention relates to trap constructions, and more particularly to a trap of the ever-set type, the primary object of the invention being to provide means to normally hold the trap door in a horizontal position.

Another object of the invention is to provide means for locking the trap door against movement, when it is desired to hold the trap out of use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a vertical sectional view through a trap constructed in accordance with the present invention.

Figure 2 is a plan view of the same.

Figure 3 is a fragmental detail view of the pulley support.

Figure 4 is a sectional view taken on line 4—4 of Figure 1.

Referring to the drawing in detail, the trap is shown as embodying a housing 5, which may be embedded in the ground surface, so that the upper wall thereof will lie flush therewith, but when the trap is to be used for trapping smaller animals such as mice or the like, the trap may be positioned on a suitable supporting surface.

A door 6 is hingedly connected to the housing 5 to permit of access to the interior of the housing 5 to remove the animals caught in the trap. The upper end of the trap is formed with an inwardly extending flange 7 which surrounds the trap door 8. The door 8 is mounted on the beam 9 that extends through the opening 10 formed in the side wall of the housing 5, at a point adjacent to the upper end thereof.

This beam 9 is supported by means of the U-shaped bracket member 11, which is mounted adjacent to the opening 10, there being provided suitable pins 12 disposed on opposite sides of the wall of the housing 5 to prevent slipping of the beam 9 when the same is tilted.

A weight 13 is carried at the outer end of the beam 9, the weight being sufficiently heavy to balance the door 8 and normally hold the same in a horizontal position as clearly shown by Figure 1 of the drawing. Extending upwardly from the wall of the housing 5, is a support embodying the vertical rods 14 formed with a loop 15 to accommodate the pulley 16, over which the flexible member 17 operates. This flexible member 17 has one end secured to the outer end of the beam 9 as at 18, the opposite end thereof being connected to the door 8 as through the eye bolt 19 and as before stated, the intermediate portion thereof passes over the pulley 16. Thus it will be seen that due to this construction, the door 8 is maintained in a horizontal or set position at all times.

The flexible member 17 tends to hold the platform in a horizontal position for the reason that if the member is taut when in horizontal position an overload of the weight would tend to lengthen the distance from 18 to 16 faster than the length from 19 to 16 and the tendency of the flexible member would be to support the platform in a horizontal position.

A bait hook indicated at 20 is secured to the door 8 so that an animal in an endeavor to remove the bait must necessarily position himself on the door 8 causing the same to tilt downwardly. In order that the door 8 may be held out of operation, a pin 21 is provided, which pin extends through an opening in the wall of the housing 5 and lies within the path of travel of the door 8 to prevent downward movement thereof.

In the operation of the device, it is obvious that when an animal places his weight on the door, that is, when the pin 21 is removed, the weight of the animal will overbalance the weight 13 causing the door to move downwardly, the animal sliding off the door and into the housing 5. With the animal's weight removed from the door 8 the weight 13 will balance the door 8 to return the door to its normal or set position.

Having thus described the invention what is claimed as new is—

In a trap, a housing having an open upper end, said housing having an opening in the wall thereof, a beam mounted within the opening and carrying a pin disposed adjacent to the opening to restrict movement of the beam, a door mounted at one end of the beam and adapted to normally close the open end of the housing, vertical rods supported by the housing and having a loop portion, a pulley supported by the loop portion, a weight at the outer end of the beam to counter-balance the weight of the door, a flexible member having one end thereof connected to the beam adjacent to the weight, the opposite end of the flexible member having connection with the door and the intermediate portion of the flexible member operating over the pulley.

In testimony that I claim the foregoing as my own, I have hereto affixed my signature in the presence of two witnesses.

FRANK COLMAN.

Witnesses:
 LUTHER SPELL,
 JOHN A. YEAGER.